Patented Jan. 28, 1930

1,744,815

UNITED STATES PATENT OFFICE

JOHN THOMAS AND HERBERT WILFRED HEREWARD, OF MURRELL HILL WORKS, CARLISLE, ENGLAND, ASSIGNORS TO SCOTTISH DYES, LIMITED, OF CARLISLE, ENGLAND

PRODUCTION OF HYDROXY-ANTHRAQUINONES

No Drawing. Application filed May 5, 1924, Serial No. 711,257, and in Great Britain February 18, 1924.

This invention relates to the manufacture of hydroxy-anthraquinones, more particularly alizarine, in connection with which it will be mainly described.

A method for producing this body described in United States Patent No. 1,446,163 involves a treatment of 2-chlor-anthraquinone with caustic alkali in the presence of a suitable oxidizing agent in an autoclave. The main object of this invention is to provide an improved or modified process of this kind especially with a view to simplifying manufacture and economizing materials.

To that end we have made a number of experiments and have observed, what may or may not be a known fact, that alizarine is practically insoluble in a solution of caustic soda of the order of 20 to 25 per cent strength. Taking advantage of this the autoclave melt can be filtered at the conclusion of the reaction and the caustic soda mother liquors used over again in succeeding charges. The filter cake consisting essentially of the sodium salt of alizarine can then be worked up for the isolation of alizarine, for example by extracting with hot water and filtering, which operation eliminates any unchanged 2-chlor-anthraquinone or other insoluble matter that may be present. The filtrates may then be acidified and the alizarine filtered off and washed in the usual way.

Alternatively, the autoclave charge can be filtered so that the alizarine goes into solution and from this solution the alizarine may be precipitated as the calcium lake by the addition of lime or calcium hydroxide. The calcium lake of alizarine is then filtered off and the filtrates which consist of caustic soda solution are then concentrated in a known manner up to 20 to 25 per cent and are then ready for use in subsequent operation. The presence of the sodium chloride which is formed in the reaction does not apparently have any harmful effect on the reaction as we have been able to carry through successfully repeated conversions of 2-chlor-anthraquinone to alizarine using caustic soda recovery in either of the above ways.

The invention in brief consists in the treatment of certain β-substituted-anthraquinones, namely β-chlor-anthraquinone and β-sulphonic-acid-anthraquinone suitable for the manufacture of alizarine bodies under suitable conditions of temperature and pressure with the filtrate or separated liquors resulting from lixiviation and condensation to an appropriate degree of the product of reaction between an anthraquinone derivative as aforesaid and a caustic alkali in the presence of a suitable oxidizing agent, namely an oxygen-containing oxidizing agent, for instance a nitrate or a chlorate, to which solution further caustic alkali has been added.

In carrying the invention into effect in one form by way of example, 204 parts by weight of a paste containing 70 parts of 2-chlor-anthraquinone are mixed with a solution of 252 parts of caustic soda and 12 parts of sodium chlorate in 820 parts of water. This mixture is thoroughly stirred and is heated in an autoclave for 24 hours at 180° C. If the autoclave is of iron it is preferable to line the vessel with a material which does not adversely affect the colour of the product, for example Monel metal or silver.

When the reaction is complete the melt is allowed to cool and filtered, for example, through a Monel metal filtering cloth. There is thus recovered 800 parts of solution containing 210 parts of caustic soda which can be used in subsequent reactions. The filter cake containing alizarine is then boiled up with 6,000 parts of water and filtered from any insoluble matter. The solution is then treated with hydrochloric acid and the alizarine filtered off. The product is of a high degree of purity and melts at about 287° C. or higher and the yield approaches the theoretical, being 66 parts of alizarine.

The hereindescribed method of recovering or reutilizing the caustic soda may be applied in the production of alizarine by the fusion of anthraquinone-beta-monosulphonic acid with caustic soda. It is applicable in connection with all β-substituted anthraquinones including for instance β-methyl anthraquinone.

Having now described our invention, what we claim as new and desire to secure by Letters Patent is:—

A process for the production of alizarine which consists in the treatment of 2-chlor-anthraquinone with an aqueous solution of caustic alkali and a soluble oxygen containing oxidizing agent, the aqueous solution being of such strength that the resulting melt can be filtered, after cooling, cooling the melt and filtering without substantial dilution of the melt, adding to the solution without purification an amount of caustic alkali to bring it to the original concentration, and employing this revivified solution for the treatment of a further quantity of 2-chlor-anthraquinone.

In testimony whereof we have signed our names to this specification.

JOHN THOMAS.
HERBERT W. HEREWARD.